United States Patent
R et al.

(10) Patent No.: US 9,269,001 B2
(45) Date of Patent: Feb. 23, 2016

(54) ILLUMINATION INVARIANT AND ROBUST APPARATUS AND METHOD FOR DETECTING AND RECOGNIZING VARIOUS TRAFFIC SIGNS

(75) Inventors: Manoj C R, Karnataka (IN); Pratap Pulugoru, Karnataka (IN); Aniruddha Sinha, Karnataka (IN); Sachin Agsebagil, Karnataka (IN)

(73) Assignee: Tata Consultancy Services Limited, Maharashtra (IN)

( * ) Notice: Subject to any disclaimer, the term of this patent is extended or adjusted under 35 U.S.C. 154(b) by 379 days.

(21) Appl. No.: 13/703,052

(22) PCT Filed: Jun. 10, 2011

(86) PCT No.: PCT/IN2011/000391
§ 371 (c)(1),
(2), (4) Date: Feb. 15, 2013

(87) PCT Pub. No.: WO2011/154978
PCT Pub. Date: Dec. 15, 2011

(65) Prior Publication Data
US 2013/0201334 A1    Aug. 8, 2013

(30) Foreign Application Priority Data
Jun. 10, 2010  (IN) .................. 1761/MUM/2010

(51) Int. Cl.
*G06K 9/00* (2006.01)
*H04N 5/235* (2006.01)
*G06T 5/00* (2006.01)
(52) U.S. Cl.
CPC ........ *G06K 9/00536* (2013.01); *G06K 9/00818* (2013.01); *H04N 5/235* (2013.01); *G06T 5/00* (2013.01)

(58) Field of Classification Search
CPC ....... H04N 5/235; G06K 9/00536; G06T 5/00
USPC ........... 382/164, 103, 104, 167; 348/148, 149
See application file for complete search history.

(56) References Cited

U.S. PATENT DOCUMENTS

| 2005/0169501 A1* | 8/2005 | Fujii ................... G06K 9/4633 382/104 |
| 2008/0137908 A1* | 6/2008 | Stein .................. G06K 9/00818 382/103 |
| 2009/0208058 A1 | 8/2009 | Schofield et al. |
| 2011/0206280 A1* | 8/2011 | Lee .......................... G06T 5/40 382/167 |

\* cited by examiner

*Primary Examiner* — Jefferey Harold
*Assistant Examiner* — Omer Khalid
(74) *Attorney, Agent, or Firm* — Hayes Soloway PC

(57) ABSTRACT

The present application provides a robust, illumination invariant apparatus and method for detecting and recognizing various traffic signs. A robust method for detecting and recognizing the traffic signs using images captured by a digital color and night vision camera, the said method characterized in being illumination invariant comprising the processor implemented steps of: transforming RGB image into HSV color model and subsequently extracting desired color components by using color quantization; filtering the noise components in the HSV color model based on object symmetrical shape property; detecting edges of the objects and subsequently detecting the distinct objects in the noise components filtered image; classifying the shapes of the traffic signs based on shape of the determined distinct objects; and recognizing the classified shapes of the traffic signs by template matching. Further, the method provides the provision for warning the driver by use of the recognized data of the traffic signs.

11 Claims, 3 Drawing Sheets

ILLUMINATION INVARIANT AND ROBUST APPARATUS AND METHOD FOR DETECTING AND RECOGNIZING VARIOUS TRAFFIC SIGNS

FIELD OF THE INVENTION

The present application generally relates to detection and recognition of traffic signs and more particularly, the application relates to an illumination invariant and robust apparatus and method for detecting and recognizing various traffic signs.

BACKGROUND OF THE INVENTION

Road safety and driver assistance functionalities are of critical significance to automobile designing and manufacturing industry. Road accidents involving pedestrians are far more frequent at night than during day. Worldwide, the number of people killed in road traffic accidents each year is estimated at almost 1.2 million, while the number injured is estimated to be as high as 50 million. Thus, the combined population of five of the world's largest cities, fall prey to such undesirable and avoidable road accidents. Many of the people killed in such accidents are the pedestrians. One of the important factors responsible for such road accidents is driver's ignorance coupled with his reduced range of vision. Often, it becomes difficult to detect and recognize traffic signs and related objects which could have cautioned the driver and subsequent undesirable sequence of events could have been avoided. Hence, fewer pedestrians would be killed or seriously injured if vehicles were equipped with improved traffic signal detection, recognizing, and alarming systems.

Absence of a system, apparatus, device or method for detection and of recognition of traffic signs in automobiles is long standing problem.

Hence there is an urgent need for a solution that overcomes some of the existing lacunae in the traffic signs detection and recognition that are Detecting the various traffic signs independent of day and night conditions (illumination invariant);
Detecting the various traffic signs in a robust manner;
Detection the various traffic signs which doesn't affected by distortions due to the noises in the images captured by the camera;
Detection the various traffic signs which doesn't affected by shape distortions due to problems in the manufacture of the traffic signs and different viewing distance; or
Recognizing the detected traffic signs in a robust manner;
Providing driver warning strategies upon traffic signs and other related objects recognition; and
The solution is simple and easy to install in the existing conventional systems.

Some of the inventions which deal with detection and of recognition of traffic signs known to us are as follows: None of them address the lacunae stated above.

United States Publication number 20080266396 filed by Gideon Stein discloses about a method is provided using a system mounted in a vehicle. The system includes a rear-viewing camera and a processor attached to the rear-viewing camera. When the driver shifts the vehicle into reverse gear, and while the vehicle is still stationary, image frames from the immediate vicinity behind the vehicle are captured. The immediate vicinity behind the vehicle is in a field of view of the rear-viewing camera. The image frames are processed and thereby the object is detected which if present in the immediate vicinity behind the vehicle would obstruct the motion of the vehicle.

U.S. Pat. No. 7,575,171 filed by Zvi Haim Lev discloses about a system and method for reliable content access using a cellular/wireless device with imaging capabilities, to use part of a printed or displayed medium for identifying and using a reference to access information, services, or content related to the reference, including capturing an image of the reference with an imaging device, sending the image via a communications network to a processing center, pre-processing to identify relevant frames within the image and to perform general purpose enhancement operations, detecting the most relevant frame within the image, and frame properties, applying geometric, illumination, and focus correction on the relevant frame, using color, aspect ration, and frame color, to perform a coarse recognition and thereby limit the number of possible identifications of a reference within the relevant frame, and using specific techniques of resealing, histogram equalization, block labeling, edge operation, and normalized cross correlation, to identify the reference within the image.

Thus, in the light of the above mentioned background of the art, it is evident that, there is a need for an apparatus, device, system and method for detecting and recognizing various shapes of traffic signs and other related objects with driver warning strategies, which is simple, easy to install and provides higher accuracy at a lower cost.

OBJECTIVES OF THE INVENTION

The primary objective is to provide an illumination invariant and robust apparatus and method for detecting and recognizing various traffic signs.

Another significant objective is to provide an illumination invariant and robust apparatus for detecting and recognizing various traffic signs which is simple, easy to install and integrate in the existing conventional systems.

Still an other objective is to provide a systematic way of detecting shapes like Triangle, Inverted triangle, Rectangle, Circle and Octogon of various traffic signs and other related objects.

Further another objective is to provide an apparatus and method for detecting the various traffic signs which doesn't affected by distortions due to the noises in the images captured by the camera.

Another objective is to provide an apparatus and method for detecting the various traffic signs which doesn't affected by shape distortions due to problems in the manufacture of the traffic signs and different viewing distance.

Yet another objective is to provide a systematic way of recognizing the detected traffic signs.

Yet another objective is to provide driver warning strategies upon traffic signs and other related objects recognition.

SUMMARY OF THE INVENTION

Before the apparatus, method and hardware enablement of the present invention are described, it is to be understood that this application is not limited to the particular apparatuses, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application which will be limited only by the appended claims.

The present application provides an illumination invariant and robust apparatus and method for detecting and recognizing various traffic signs with driver warning strategies.

The present application embodies a robust apparatus for detecting and recognizing the traffic signs, the said apparatus characterized in being illumination invariant, comprising of: a digital color and night vision camera disposed on the vehicle for capturing an image, wherein the said color and night vision camera can be disposed on the either on the dashboard or in front or inside or top of the vehicle. In a preferred embodiment, the said color and night vision camera is disposed in front of the vehicle, wherein the vehicle comprises plurality of vehicles in automatic transportation system and specifically comprises two wheeler vehicle, three wheeler vehicle and four wheeler vehicle, etc. A processor for analyzing the captured image in real-time for detecting and recognizing the traffic signs. The said processor can be selected from the group of computer, Laptop, PDA, microprocessor, microcontroller and any other computing device. In a preferred embodiment, the said processor is microprocessor. In a preferred embodiment the microprocessor embedded inside the body of the digital color and night vision camera In one aspect, a robust method for detecting and recognizing the traffic signs using images captured by a digital color and night vision camera, the said method characterized in being illumination invariant comprising the various processor implemented steps.

In another aspect, initially, a plurality of real time images associated with at least one traffic sign is acquired by employing digital color and night vision camera, wherein the said digital color and night vision camera can be any known digital color and night vision camera.

Upon acquiring the plurality of window frames of real time images, the images are transformed into HSV color model and subsequently desired color components is extracting using color quantization by employing a processor, wherein the said image is RGB image according to one preferred embodiment.

In one aspect, the noise components in the HSV color model is filtered based on object symmetrical shape property by the processor upon transforming the RGB images into HSV color model.

In another aspect, edges of the objects are detected and subsequently the distinct objects are detected in the noise components filtered image by the processor.

In another aspect, upon detecting the distinct object, the shapes of the traffic signs are classified based on shape of the determined distinct objects by the processor.

In another aspect, upon classifying the shapes of the traffic signs, the classified shapes of the traffic signs is recognized using template matching by the processor.

In yet another aspect an alert means is provided for warning the driver characterized by use of the recognized data of the shapes of the traffic signs, wherein the alert means can be audio and audio visual device including but not limited to an alarm, a voice based caution, an indicator with display.

BRIEF DESCRIPTION OF DRAWINGS

The foregoing summary, as well as the following detailed description of preferred embodiments, is better understood when read in conjunction with the appended drawings. There is shown in the drawings example embodiments. The application is not limited to the specific apparatuses, systems, devices and methods disclosed in the drawings.

DETAILED DESCRIPTION OF THE INVENTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The present application provides an illumination invariant and robust apparatus and method for detecting and recognizing various traffic signs with driver warning strategies.

Figure 1:
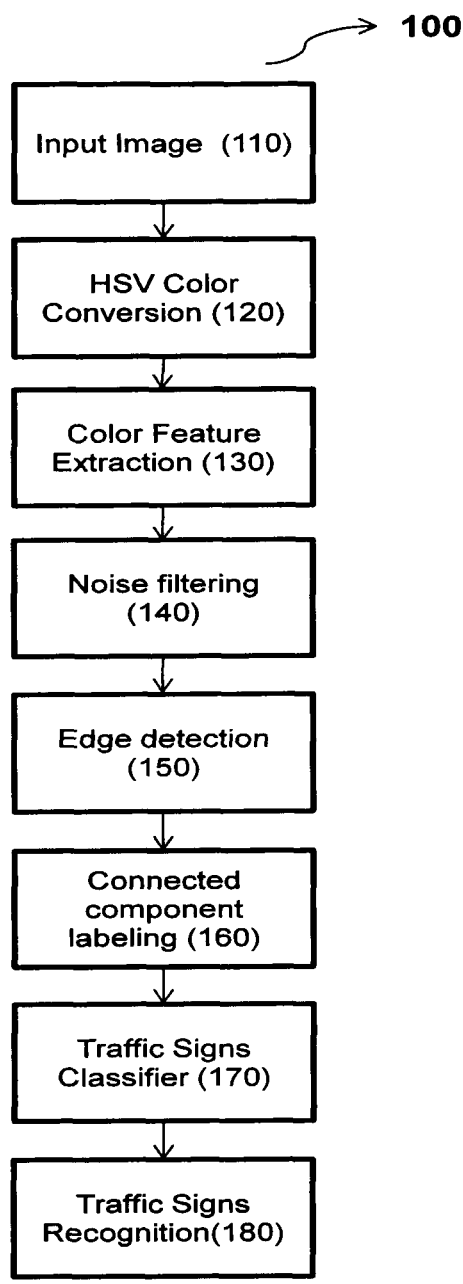
FIG. 1 shows illumination invariant and robust method for detection and recognition of traffic signs and other related objects.

The present application embodies a robust apparatus for detecting and recognizing the traffic signs, the said apparatus characterized in being illumination invariant, comprising of: a digital color and night vision camera disposed on the vehicle for capturing an image, wherein the said color and night vision camera can be disposed on the either on the dashboard or in front or inside or top of the vehicle. In a preferred embodiment, the said color and night vision camera is disposed in front of the vehicle, wherein the vehicle comprises plurality of vehicles in automatic transportation system and specifically comprises two wheeler vehicle, three wheeler vehicle and four wheeler vehicle, etc. A processor for analyzing the captured image in real-time for detecting and recognizing the traffic signs. The said processor can be selected from the group of computer, Laptop, PDA, microprocessor, microcontroller and any other computing device. In a preferred embodiment, the said processor is microprocessor. In a preferred embodiment the microprocessor embedded inside the body of the digital color and night vision camera FIG. 1 shows illumination invariant and robust method for detection and recognition of traffic signs and other related objects. In one embodiment, a robust method for detecting and recognizing the traffic signs using images captured by a digital color and night vision camera, the said method characterized in being illumination invariant comprising various processor implemented steps.

The above said robust method comprises various processor implemented steps. In the first step of the proposed method, the digital color and night vision camera captures a plurality of real time images associated with at least one traffic sign 110 present in front of the vehicle continuously. According to one embodiment, the processor executes the codes that take RGB images by using color segmentation algorithm in the digital color and night vision camera. In the second step of the proposed method, the processor executes the codes that transforms 120 the said RGB images to HSV color space, the HSV color space is chosen because Hue is invariant to the variations in light conditions as it is multiplicative/scale invariant, additive/shift invariant, and it is invariant under saturation changes. Hue is unaffected by shadows and highlights on the object when the illumination is white.

According to another embodiment, the processor executes the codes that convert every pixel of the image from RGB to HSV color space to have separate information of color, intensity and impurities by using the color segmentation algorithm. The processor executes the codes that transform the Red, Green, and Blue color values of each pixel in the input image into HSV color values by using the following equations.

$$m = \max(r, g, b) \tag{1}$$

$$n = \min(r, g, b)$$

$$v = m/255.0$$

$$s = \begin{cases} 0.0 & \text{if } m = 0 \\ (m-n)/m & \text{if } m \neq 0 \end{cases}$$

$$h = \begin{cases} -1 & \text{if } s = 0 \\ 60*(g-b)/(m-n) & \text{if } m = r \\ 60*(b-r)/(m-n) + 120 & \text{if } m = g \\ 60*(r-g)/(m-n) + 240 & \text{if } m = b \end{cases}$$

Where r,g,b the RGB are color values (0-255) of a pixel, m and n are the maximum and minimum of r,g,b and h,s,v indicates the hue (0-360), saturation (0-1.0) and value (0-1.0) of the pixel, respectively.

In the third step of the proposed method, upon transforming the RGB images into HSV color space, the processor executes the codes that extract the desired color components 130 by using color quantization for reducing the amount of image data and also simplifies the processing of traffic sign detection by treating each of the eight color planes as a binary image, wherein the color, intensity and impurities ranges are very big.

In a preferred embodiment, the color quantization scheme is summarized are as following:

Let h,s,v be the HSV domain color value, with s and v is normalized between [0, 1], for a particular r,g,b value and index is the quantized bin index.

Now, a pure black area can be found in $v \in [0, 0.2]$ With index=0

Gray area can be found in $s \in [0, 0.2]$, $v \in [0.2, 0.8]$ with index$\in \lfloor ((v \; 0.2) \times 10) \rfloor + 1$ White area can be found in $s \in [0, 0.2]$, $v \in [0.8, 1.0]$ with index=7

The color area is found in $s \in [0.2, 1.0]$ and $v \in [0.2, 1.0]$ for different h values.

Let $H_{index}$, $S_{index}$ and $V_{index}$ be the quantized index for different h,s,v value.

$$S_{index} = \begin{cases} 0, & \forall s \in (0.2, 0.5], \\ 1, & \forall s \in (0.5, 1.0] \end{cases} \tag{2}$$

$$V_{index} = \begin{cases} 0, & \forall v \in (0.2, 0.8], \\ 1, & \forall v \in (0.8, 1.0] \end{cases}$$

$$H_{index} = \begin{cases} 0, & h \in (330 - 360, 0 - 22) & \text{Red} \\ 1, & h \in (22, 45) & \text{Orange} \\ 2, & h \in (45, 70) & \text{Yellow} \\ 3, & h \in (70, 155) & \text{Green} \\ 4, & h \in (155, 186) & \text{Cyan} \\ 5, & h \in (186, 278) & \text{Blue} \\ 6, & h \in (278, 330) & \text{Purple} \end{cases}$$

In the next step, the processor executes the codes that calculates the histogram bin index by using the following equation index=$4*H_{index}+2*S_{index}+V_{index}+8$;

In the fourth step of the proposed method, the processor executes the codes that filter the noise components in the HSV color model based on objects symmetrical shape property, wherein all the traffic signs are regular in shape and exhibits symmetry property on the edges. In order identify noise in the image and filter the same 140, the processor executes the following steps:

In the first step, traverse Calculate centroid Cx and Cy of objects (Region Of Interest or ROI) using the following equations $$Cx = \frac{m_{10}}{m_{00}} \text{ and } Cy = \frac{m_{01}}{m_{00}} \tag{3}$$

$$\text{Where } m10 = \sum_x \sum_y x*I(x,y), m01 = \sum_x \sum_y y*I(x,y)$$

In the next step, traverse horizontally from left along each ROI, and consider only the elements that appear in the first stroke. Let 'x' and 'y' represents the co-ordinates of the pixel components that appear in the first shot and 'left_Count' be the number of elements that appear in first stroke.

In the next step, calculate distance from centroid to the left side elements that appear in first shot. Call this distance as left distance 'left_distance'.

In the next step, calculate distance from centroid to the right side elements that appear in first stroke. Call this distance as right distance 'right_distance'

It was observed that for a regular shaped object

Sum(left_distance/right_distance)≈max(left_count, right_count).

In the next step, the processor executes the codes that identify and filter the noises by using the above said condition, if any objects that violate this condition will be considered as a noise and won't be considered for further processing.

In the fifth step of the proposed method, the processor executes the codes that extract edges 150 of the objects in the noise components filtered image using Canny Edge Detection algorithm.

This step helps to identify the boundaries of the objects which in turn are required to accurately differentiate between different objects in the image. Canny Edge Detection works on the principle of deriving optimal edge detector for the criteria of detection, localization and minimizing multiple responses to a single edge using the following steps executed by the processor:

In the first step, the processor executes the codes that find the intensity gradients, wherein the Intensity Gradients at each pixel in the image are determined by applying the Sobel Operator. First step is to approximate the gradient in the X and Y direction using the following Kernel Equation.

$$K_{GX} = \begin{bmatrix} -1 & 0 & 1 \\ -2 & 0 & 2 \\ -1 & 0 & 1 \end{bmatrix}$$

$$K_{GY} = \begin{bmatrix} 1 & 2 & 1 \\ 0 & 0 & 0 \\ -1 & -2 & -1 \end{bmatrix}$$

The Gradient magnitudes also known as edge strengths are determined by Euclidean distance measurement.

$$|G| = \sqrt{G_x^2 + G_y^2}$$

where Gx and Gy is the gradients in the x and y directions respectively. The direction of the edges is determined by the following equation:

$$\theta = \arctan\left(\frac{|G_y|}{|G_x|}\right)$$

In the next step, the processor executes the codes that convert the blurred images to sharp edge images by using the following steps:
1. Round the gradient direction to the nearest 45° and use 8 connectivity.
2. Compare the edge strength of the current pixel with the edge strength of the pixel in the positive and negative gradient direction i.e. if the gradient direction is north (theta=90°), compare with pixels to the north and south.
3. If the edge strength of the current pixel is large, value of the edge strength is preserved. If not, value is removed.

In the next step, the processor executes the codes that use the canny Edge detection algorithm for double thresholding. Edge pixels stronger than the high threshold are marked as strong; edge pixels weaker than the low threshold are marked as weak.

In the next step, the processor executes the codes that detect the edge by using Hysteresis, wherein the strong edges are included in the final edge image where as weak edges are included if and only if they are connected to the atrog edge pixels.

In the sixth step of the proposed method, the processor executes the codes that detect the distinct objects in the image by using connected component labeling algorithm 160. The connected component labeling is done to detect the connected regions in the image. It is found out using a two step approach.

Image is scanned pixel by pixel from left to right and top to bottom. P is the current pixel in the scanning process and 4-nbr is four neighboring pixels in N, NW, NE, W direction of P. A label is assigned to P depending on the value of P and the values of its 4-nbrs. If p is 0, move on to the next scanning position. If P is 1 and all values in 4-nbrs are 0, assign a new label to P. If only one value in 4-nbrs is not 0, assign its values to P. If two or more values in 4-nbrs are not 0, assign one of the labels to P and mark labels in 4-nbrs as equivalent.

Size of the object is found out by knowing the Xmin, Xmax, Ymin and Ymax values of the connected component Labeled Object.

Finally the object is deleted whose value is below the threshold.

In the seventh step of the proposed method, the processor executes the codes that classify 170 the various shapes of the traffic signs based on shape of the determined distinct objects.

Objects are found out by Connected Component Labeling after deleting all those which are below the threshold level. These objects may be Triangle, Inverted Triangle, rectangle, Octagon, Circle, ellipse or any arbitrary shape.

Triangle, Inverted Triangle, Rectangle or Octagon Shape Detection:

The processor executes the following steps to classify the Triangle, Inverted triangle, Rectangle or Octagon shapes: In the first step, the processor executes the codes that detect the lines in the shapes by using probabilistic hough transform; In the second step, the processor executes the codes that determine the line segments which are actually belong to the same line and merge them by using line merging algorithm; and In the final step, the processor executes the codes that calculate the sum of interior angles defined by the endpoints of the line merging algorithm for differentiating triangle, inverted triangle, rectangle or octagon shapes of traffic signs which gives an accurate detection of these different shapes of traffic signs.

According to one exemplary embodiment, the classification of the Triangle, Inverted triangle, Rectangle or Octagon shapes comprises the processor implemented steps of: For finding the object shape as Triangle, Rectangle or Octagon, Progressive Probabilistic Hough transform is used. The Hough transform is used to find the number of lines in the Object. But the Hough transform is not the fastest one to find the finite number of lines in an arbitrary shaped object. So another variant of Hough called Progressive Probabilistic Hough Transform is used to find the number of finite lines in an object. Progressive probabilistic Hough transforms involves the following steps.

1. Create a copy (IMG2) of the input edge image (IMG1).
2. If IMG2 is empty then finish.
3. Update the accumulator with a randomly selected pixel from IMG2.
4. Remove the pixel from IMG2.
5. If the bin with the largest value in the accumulator (BINX) that was modified is lower than the threshold, goto (1).
6. Search in IMG1 along a corridor specified by BINX, and find the longest segment of pixels either continuous or exhibiting gaps not exceeding a given threshold.
7. Remove the pixels in the segment from IMG2.
8. Clear BINX.
9. If the detected line segment is longer than a given minimum length, add it into the output list.
10. Go to (2)

The Progressive Probabilistic Hough transform returns the number of lines in the shape. Line merging algorithm is implemented by the processor to find out the line segments which are actually belong to the same line and merge them. This algorithm involves the following processor implemented steps of:

1. Let the line segments are 'i' and 'j'. 'a' and 'b' are the coordinates of line segment 'i', 'c' and 'd' are the coordinates of line segment 'j'.
2. Let $X_G$ and $Y_G$ be the centroid of the merged line $$x_G = \frac{l_i(a_x + b_x) + l_j(c_x + d_x)}{2(l_i + l_j)}$$

-continued $$y_G = \frac{l_i(a_y+b_y)+l_j(c_y+d_y)}{2(l_i+l_j)}$$

3. The orientation of merged line $\theta_r$ is the weighted sum of the orientations of segment i ($\theta_i$) and segmentation j($\theta_j$). The orientation of merged line $\theta_r$ is given by If $|\theta_i - \theta_j| \le \frac{\pi}{2}$ Then $$\theta_r = \frac{l_i\theta_i + l_j\theta_j}{l_i + l_j}$$

else $$\theta_r = \frac{l_i\theta_i + l_j\left(\theta_j - \pi\frac{\theta_j}{|\theta_j|}\right)}{l_i + l_j}$$

Where $l_i$, and $l_j$ and $\theta_i$, $\theta_j$ represent the length and direction of segment l and j respectively.

4. Frame ($X_G$, $Y_G$) centered on the centroid ($X_G$, $Y_G$) and having the $X_G$ axis parallel to the direction $\theta_r$ of the merged line.

5. Coordinates of the endpoints a, b, c and d of both segments in the frame ($X_G$, $Y_G$) are determined. The coordinate transformation is a translation followed by a rotation:

$$\delta_{XG}=(\delta_y-y_G)\sin\theta_r+(\delta_x-x_G)\cos\theta_r$$

$$\delta_{YG}=(\delta_y-y_G)\cos\theta_r-(\delta_x-x_G)\sin\theta_r$$

where ($\delta_{XG}$, $\delta_{YG}$) are the coordinates of the point $\delta$ in frame ($X_G$, $Y_G$).

6. The two orthogonal projections over the axis XG of the four endpoints a, b, c and d, which are farther apart, define the endpoints of the merged line.

7. If the sum of the angles between the lines is approximately 180° then the object shape is recognized as Triangle.

8. If the angle between two consecutive lines is 135° then the shape is recognized as an Octagon.

9. If the angle between two consecutive lines is 90° and sum of all the angles is 360° then the shape is recognized as a Rectangle.

The above proposed method makes sure that even the traffic signs which has some kind of distortions and may not be perfect shapes are also detected with good accuracy as well as detect the triangle, inverted triangle, rectangle, or octagon shapes of traffic signs robustly which may includes distortions due to the noises in the images captured by the digital color and night vision camera, shape distortions, in the real word traffic signs, due to problems in the manufacture of the traffic signs and due to different viewing distance so that there will be deviations from the perfect the triangle, inverted triangle, rectangle, or octagon shapes.

Circle or Ellipse Shape Detection:

The processor executes the following steps to classify the Triangle, Inverted triangle, Rectangle or Octagon shapes: In the first step, the processor executes the codes that detect the lines in the shapes by using probabilistic hough transform; In the second step, the processor executes the codes that determine the line segments which are actually belong to the same line and merge them by using line merging algorithm; and In the final step, the processor executes the codes that detect the circular or ellipse shape of the traffic signs using the ellipse detection algorithm based on the major and minor axes length of the candidate traffic sign, wherein the real world circular signs are not exactly circular shape at different distance from which it is viewed and due to problems in the manufacture of the circular shape of the traffic signs. As most of the real time circular signs were not circles but was falling in the ellipse category, this algorithm implemented by the processor proves to be optimal and more accurate.

According to one exemplary embodiment, the algorithm implemented by the processor involves the following steps to classify the ellipse or circular shapes of the traffic signs.

Figure 3:
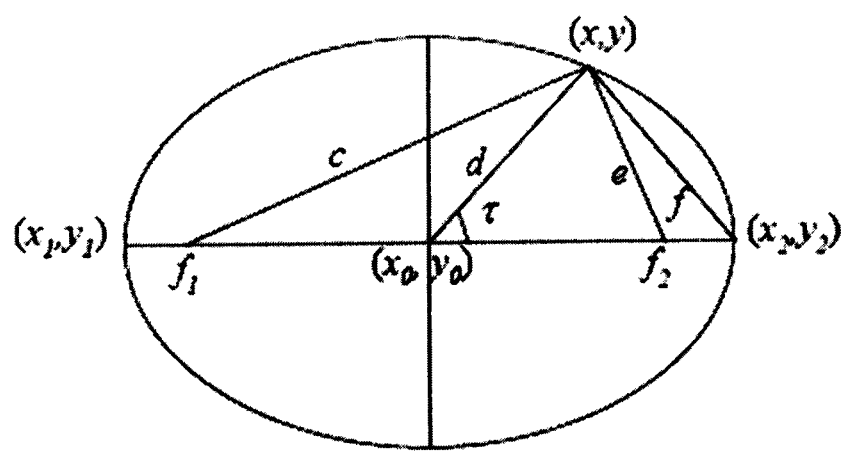
FIG. 3 shows a graphical representation of an ellipse and of the coordinates of a first ellipse point, a second ellipse point, a third ellipse point, and a center point of the ellipse.

1. Store all edge pixels in a one dimensional array.
2. Clear the accumulator array.
3. For each pixel ($x_1$, $y_1$), carry out the following steps from (4) to (14) as shown in the FIG. 3.
4. For each other pixel ($x_2$, $y_2$), if the distance between ($x_1$, $y_1$) and ($x_2$, $y_2$) is greater than the required least distance for a pair of pixels to be considered then carry out the following steps from (5) to (14).
5. From the pair of pixels ($x_1$, $y_1$) and ($x_2$, $y_2$), using equations (1) to (4) to calculate the center, orientation and length of major axis for the assumed ellipse.

$$x_0=(x_1+x_2)/2 \quad (1)$$

$$y_0=(y_1+y_2)/2 \quad (2)$$

$$\alpha=[(x_2-x_1)^2+(y_2-y_1)^2]^{1/2}/2 \quad (3)$$

$$\alpha=\mathrm{atan}[(y_2-y_1)/(x_2-x_1)] \quad (4)$$

6. For each third pixel (x, y), if the distance between (x, y) and (x0, y0) is greater than the required least distance for a pair of pixels to be considered then carry out the following steps from (7) to (9).
7. Using equations (5) and (6) to calculate the length of minor axis.

$$b^2=(\alpha^2 d^2 \sin^2\tau)/(\alpha^2-d^2\cos^2\tau)$$

where cos $\tau$ is $$\cos\tau=(\alpha^2+d^2-f^2)/(2\alpha d)$$

8. Increment the accumulator for this length of minor axis by 1.
9. Loop until all pixels are computed for this pair of pixels.
10. Find the maximum element in accumulator array. The related length is the possible length of minor axis for assumed ellipse. If the vote is greater than the required least number for assumed ellipse, one ellipse is detected.
11. Output ellipse parameters.
12. Remove the pixels on the detected ellipse from edge pixel array.
13. Clear accumulator array.
14. Loop until all pairs of pixels are computed.
15. Superimpose detected ellipses on the original image.
16. End.

In the final step of the proposed method, the processor executes the codes that recognize the classified shapes of the traffic signs 180 (as briefly shown in the FIG. 2) by template matching.

According to one exemplary embodiment, recognizing the detected various shaped of the traffic signs comprises the various processor implemented steps.

For recognizing the Traffic signs, a Template-Matching invariant to Rotation and Scaling is made use of. Once shape of the Object is detected, then the processor executes the codes that extract the image inside the shape and match the existing templates in the Database using template Matching Algorithm. The Template Matching Algorithm implemented by the processor involves the following steps:
1) First step (Radial Filtering): The Radial sampling filter uses the projections of input image 'A' and the template image 'Q'. Based on these images radial filtering algorithm implemented by the processor gives the how much angle the input image tilted. Radial sampling is the average grayscale of the pixels of B located by radial lines with one vertex at (x, y), length $\lambda$ and inclination $\alpha$.

$$\mathrm{Ras}_B^\lambda(x, y, \alpha) = \int_0^\lambda B(x+t \cos \alpha, y+t \sin \alpha) \, dt$$

2) Given the template Q and the set of m angle inclinations $(\alpha_0, \alpha_1, \ldots, \alpha_{m-1})$, Q is radially sampled using $\lambda = r_{l-1}$ (the largest sampling circle radius), yielding a vector $R_Q$ $$R_Q[j] = \mathrm{Ras}_Q^{n-1}(x_0, y_0, \alpha_j), 0 \le j < m$$

with m features
where $(x_0, y_0)$ is center pixel of image Q

3) Radial filtering uses the vectors $R_A[x,y]$, $R_Q$ and contrast and brightness thresholds $t_\beta$ and $t_\gamma$ to detect the radial sampling correlation RasCorr at the best matching angle $$RasCorr_{A,Q}(x, y) = \underset{j=0}{\overset{m-1}{\mathrm{MAX}}}[|Corr(R_A[x, y], cshift_j(R_Q))|](x, y) \in \mathrm{f\_gr\_cand}(A)$$

where $cshift_j$ means circular shifting of j positions of argument vector.

Final step (Template Matching filter): Template Matching filter implemented by the processor computes the contrast/brightness aware correlation of the template image Q and the input image A. If the absolute value of the correlation is above some threshold t, the template is considered to be found at pixel (x, y).

Figure 2:
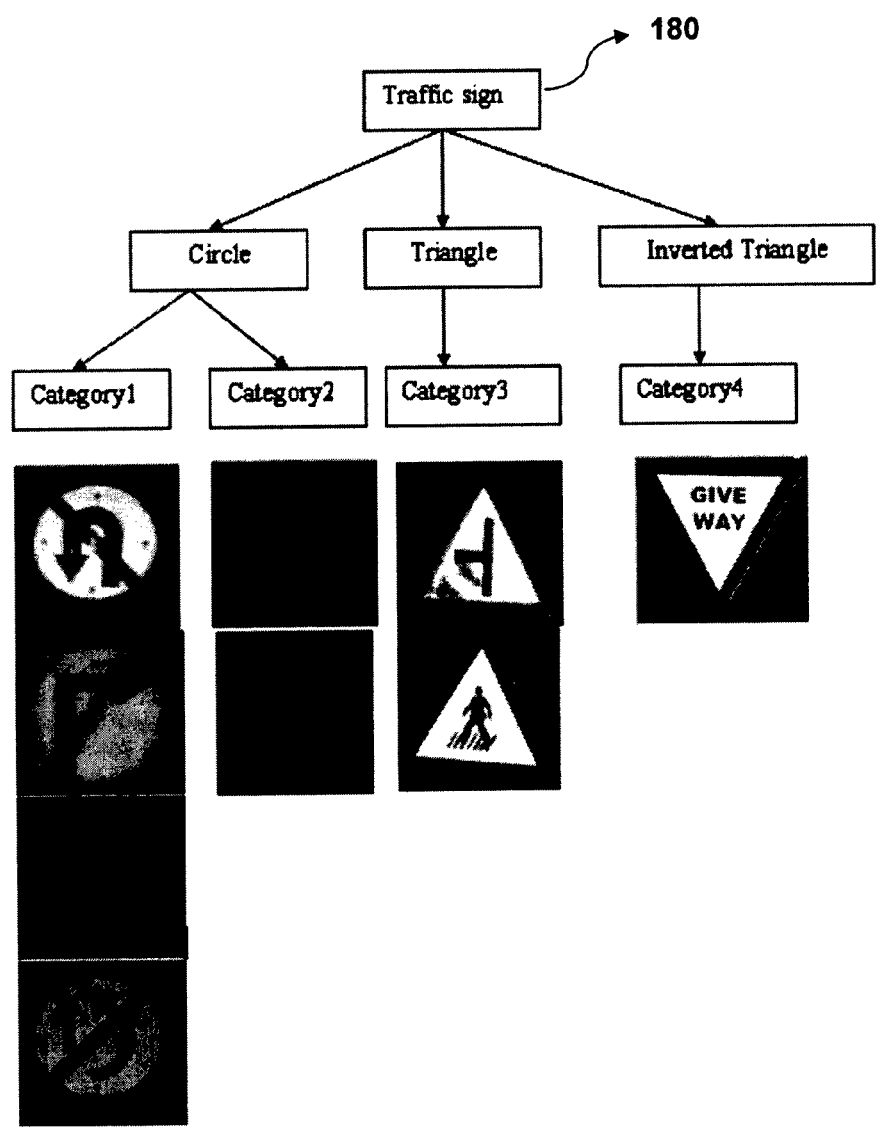
FIG. 2 shows hierarchical strategy for traffic signs recognition.

FIG. 2 shows hierarchical strategy for traffic signs recognition. According to another embodiment, the processor executes the codes that recognize the classified shapes of the traffic signs by template matching, wherein the shapes of the traffic signs are categorized broadly in three categories namely circle, triangle and inverted triangle. The circle may be classified into two categories namely category 1 and category 2. The category 1 comprises the traffic signs such as u-turn prohibited, Right turn prohibited, Pedestrians prohibited, Overtaking prohibited, etc. The category 2 comprises the traffic signs such as No stopping or standing and No parking, etc. The Triangle may be classified as category 3. The category 3 comprises the traffic signs such as compulsory ahead or turn left and pedestrian crossing, etc. The inverted triangle may be classified as category 4 and the category 4 comprises the traffic signs such as give way, etc.

According to one embodiment, the above proposed method also provides provision for warning the driver characterized by use of the recognized data of the shapes of the traffic signs, wherein the provision cab be alert means which is disposed in the vehicle and the alert means can be audio and audio visual device including but not limited to an alarm, a voice based caution, an Indicator with display.

According to one embodiment, an illumination invariant and robust apparatus for detecting and recognizing various traffic signs which is easy to install and integrate in the existing conventional systems.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle and scope.

We claim:

1. A method for detecting and recognizing traffic signs using images captured by a digital color and night vision camera, the said method characterized in being illumination invariant comprising:
    transforming, by a processor, RGB image into HSV color model and subsequently extracting desired color components by using color quantization;
    filtering, by the processor, noise components in the HSV color model in order to obtain a filtered image, wherein the filtered image is obtained by,
        computing a centroid of each Region of Interest (ROI) in the HSV color model,
        calculating a left distance indicating a distance from the centroid to a plurality of left side elements present in the HSV color model,
        calculating a right distance indicating a distance from the centroid to a plurality of right side elements present in the HSV color model,
        filtering the noise components based on the left distance, the right distance, a count of the plurality of left side elements, and a count of the plurality of right side elements;
    detecting, by the processor, edges of objects in the filtered image and subsequently detecting distinct objects in the filtered image;
    classifying, by the processor, shapes of traffic signs based on shape of the distinct objects; and
    recognizing, by the processor, the shapes of the traffic signs by template matching.

2. The method of claim 1, wherein the shapes of the traffic signs comprises triangle, inverted triangle, rectangle, octagon, circle or ellipse.

3. The method of claim 1, wherein the shapes of the traffic signs comprise
    distortions due to the noise components in the images captured by the digital color and the night vision camera;
    shape distortions, in the real word traffic signs, due to problems in the manufacture of the traffic signs; or
    shape distortions due to different viewing distance.

4. The method of claim 1, wherein the shapes are classified by:
    detecting lines in the shapes by using probabilistic hough transform;
    determining line segments and subsequently merging the line segments if the line segments belong to lines; and
    calculating sum of interior angles defined by the endpoints for differentiating triangle, inverted triangle, rectangle or octagon shapes of traffic signs.

5. The method of claim 1, wherein the shapes are classified by:
- detecting lines in the shapes by using probabilistic hough transform;
- determining line segments and subsequently merging the line segments if the line segments belong to lines; and
- detecting major and minor axes length of a traffic sign for differentiating a circle or an ellipse shapes of the traffic signs.

6. The method of claim 1, further comprising the provision for warning the driver based on the shapes of traffic signs.

7. The method of claim 1, wherein the digital color and the night vision camera are disposed either on a dashboard or in front or inside or top of a vehicle.

8. An apparatus for detecting and recognizing traffic signs, the apparatus characterized in being illumination invariant, comprising of:
- a digital color and a night vision camera disposed on the vehicle for capturing an image; and
- a processor, coupled with a memory, embedded therein for analyzing the image in real-time for detecting and recognizing the traffic signs by:
  - transforming RGB image into HSV color model and subsequently extracting desired color components by using color quantization;
  - filtering noise components in the HSV color model in order to obtain a filtered image, wherein the filtered image is obtained by:
    - computing a centroid of each Region of Interest (ROI) in the HSV color model,
    - calculating a left distance indicating a distance from the centroid to a plurality of left side elements present in the HSV color model,
    - calculating a right distance indicating a distance from the centroid to a plurality of right side elements present in the HSV color model,
    - filtering the noise components based on the left distance, the right distance, a count of the plurality of left side elements, and a count of the plurality of right side elements;
  - detecting edges of objects in the filtered image and subsequently detecting distinct objects in the filtered image;
  - classifying shapes of traffic signs based on shape of the distinct objects; and
  - recognizing the shapes of the traffic signs by template matching.

9. The apparatus of claim 8, further comprises an alert means for warning the driver based on the shapes of the traffic signs.

10. The apparatus of claim 8, wherein the digital color and night vision camera are disposed either on a dashboard or in front or inside or top of a vehicle.

11. The method of claim 1, wherein the filtered image includes at least one object, present in the HSV color model, which is in accordance with a pre-defined equation, and wherein the pre-defined equation is:

$$\text{sum(left distance/right distance)} \approx \text{max(count of the plurality of left side elements and count of the plurality of right side elements)}.$$

* * * * *